(12) United States Patent
Matthiesen et al.

(10) Patent No.: US 10,679,141 B2
(45) Date of Patent: Jun. 9, 2020

(54) USING CLASSIFICATION DATA AS TRAINING SET FOR AUTO-CLASSIFICATION OF ADMIN RIGHTS

(71) Applicant: International Business Machines Corporation, Armonk, NY (US)

(72) Inventors: Brian Robert Matthiesen, Santa Margarita, CA (US); Gee Ngoo Chia, Morrisville, NC (US); John Leslie Harter, Fuquay Varina, NC (US); David Walsh Palmieri, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 14/869,043

(22) Filed: Sep. 29, 2015

(65) Prior Publication Data

US 2017/0091658 A1 Mar. 30, 2017

(51) Int. Cl.
*G06N 20/00* (2019.01)
*G06F 21/00* (2013.01)
*H04L 29/06* (2006.01)
*G06F 21/45* (2013.01)

(52) U.S. Cl.
CPC ............ *G06N 20/00* (2019.01); *G06F 21/00* (2013.01); *G06F 21/45* (2013.01); *H04L 63/102* (2013.01)

(58) Field of Classification Search
CPC .... G06F 21/00; G06F 21/30; G06F 17/30604; G06F 21/45; H04L 63/00; H04L 63/10; H04L 63/08; H04L 63/102; G06N 99/005; G06N 20/00
See application file for complete search history.

(56) References Cited

U.S. PATENT DOCUMENTS

| | | | | |
|---|---|---|---|---|
| 6,836,773 | B2 * | 12/2004 | Tamayo | G06F 16/951 |
| 9,697,248 | B1 * | 7/2017 | Ahire | G06F 16/2365 |
| 2005/0138419 | A1 * | 6/2005 | Gupta | G06F 21/6218 |
| | | | | 726/4 |
| 2006/0089987 | A1 * | 4/2006 | Igarashi | H04L 29/12783 |
| | | | | 709/225 |

(Continued)

OTHER PUBLICATIONS

Rozac, et al, "User behavior analysis based on Identity Management System's log data," ERK '2012.

*Primary Examiner* — Kamran Afshar
*Assistant Examiner* — Brent Johnston Hoover
(74) *Attorney, Agent, or Firm* — Jeffrey S. LaBaw; David H. Judson

(57) ABSTRACT

An identity and access management IAM system is augmented to provide for supervised, iterative machine learning (ML), preferably with a user-generated training set for classification. The training set may include various types of data, including characteristics or attributes of the account types, the users, or the like. A goal of the initial ML training, which may include one or multiple passes, is to enable the machine to identify specific characteristics or attributes that provide a good classification result, with the resulting classifications then applied within the IAM system. In particular, the output of the ML system may be used by the IAM system for enforcing rights associated with the identified accounts, managing accounts, and so forth.

20 Claims, 4 Drawing Sheets

(56) References Cited

U.S. PATENT DOCUMENTS

| | | | |
|---|---|---|---|
| 2006/0161783 A1* | 7/2006 | Aiken | G06F 21/335 |
| | | | 713/182 |
| 2012/0101870 A1* | 4/2012 | Gates | G06Q 10/0635 |
| | | | 705/7.28 |
| 2012/0109821 A1 | 5/2012 | Barbour et al. | |
| 2013/0185230 A1 | 7/2013 | Zhu et al. | |
| 2014/0040170 A1* | 2/2014 | Zheng | H04L 63/1408 |
| | | | 706/12 |
| 2014/0351176 A1 | 11/2014 | Jan et al. | |
| 2014/0372346 A1 | 12/2014 | Phillips et al. | |

* cited by examiner

USING CLASSIFICATION DATA AS TRAINING SET FOR AUTO-CLASSIFICATION OF ADMIN RIGHTS

BACKGROUND

Technical Field

This disclosure relates generally to the field of digital resource access, and more particularly to detecting identity-centric risks within a computing machine-based governance system.

Background of the Related Art

Identity and Access Management Governance is a set of processes and policies that organizations use to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments.

Automated systems for IAM health checking detect identity-centric risks within a governance system by scanning for one or more weakness patterns, such as too many "admins" (privileged accounts) configured, account sharing, or cloning of access permissions. While detecting these and other such conditions provides useful information, known detection mechanisms are time-consuming and require large amounts of data to be read or extracted from the systems being governed. Further, identifying "admins" is not always straightforward, as such accounts are not always classified in an "admin" group.

It would be desirable to provide IAM systems with the ability to identify admin and other types of accounts in an efficient and reliable manner.

BRIEF SUMMARY

According to this disclosure, an identity management system is augmented with one or more machine learning (ML) techniques to facilitate identification of account types, such as "admin" accounts. Preferably, the user trains a machine (executing an ML algorithm) by classifying several accounts, e.g., as "admin," "non-privileged," or the like. Given the initial training, the system then auto-classifies one or more additional accounts. The result of the auto-classification step is then scored for accuracy, possibly using human involvement. Once the algorithm reaches an acceptable level of correct classifications, the machine takes over classification. Thereafter, an operator may be notified only if a classification result is not definitive.

Thus, the approach provides supervised, iterative machine-based learning, preferably with a user-generated training set for classification. The training set may include various types of data, including characteristics or attributes of the account types, the users, or the like. A goal of the initial ML training (which may include one or multiple passes) is to enable the machine to identify specific characteristics or attributes that provide a good classification result, with the resulting classifications then applied within the IAM system. In particular, the output of the ML system may be used by the IAM system for enforcing rights associated with the identified accounts, modifying, suspending or deleting accounts, and so forth.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
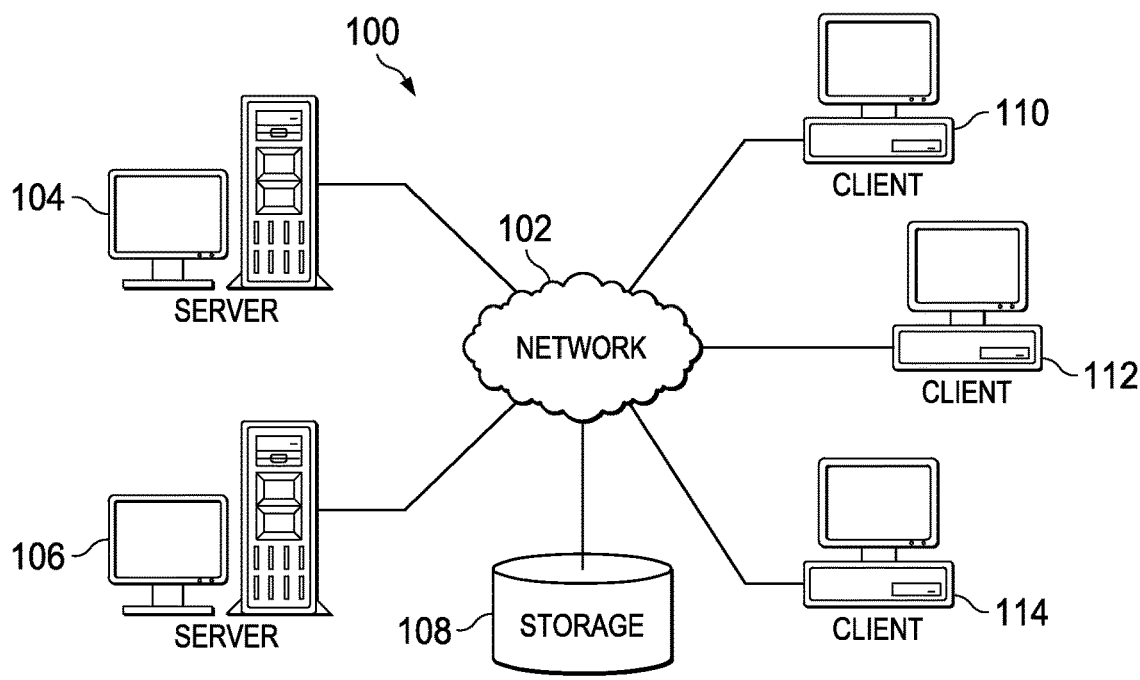
FIG. 1 depicts an exemplary block diagram of a distributed data processing environment in which exemplary aspects of the illustrative embodiments may be implemented.
Figure 2:
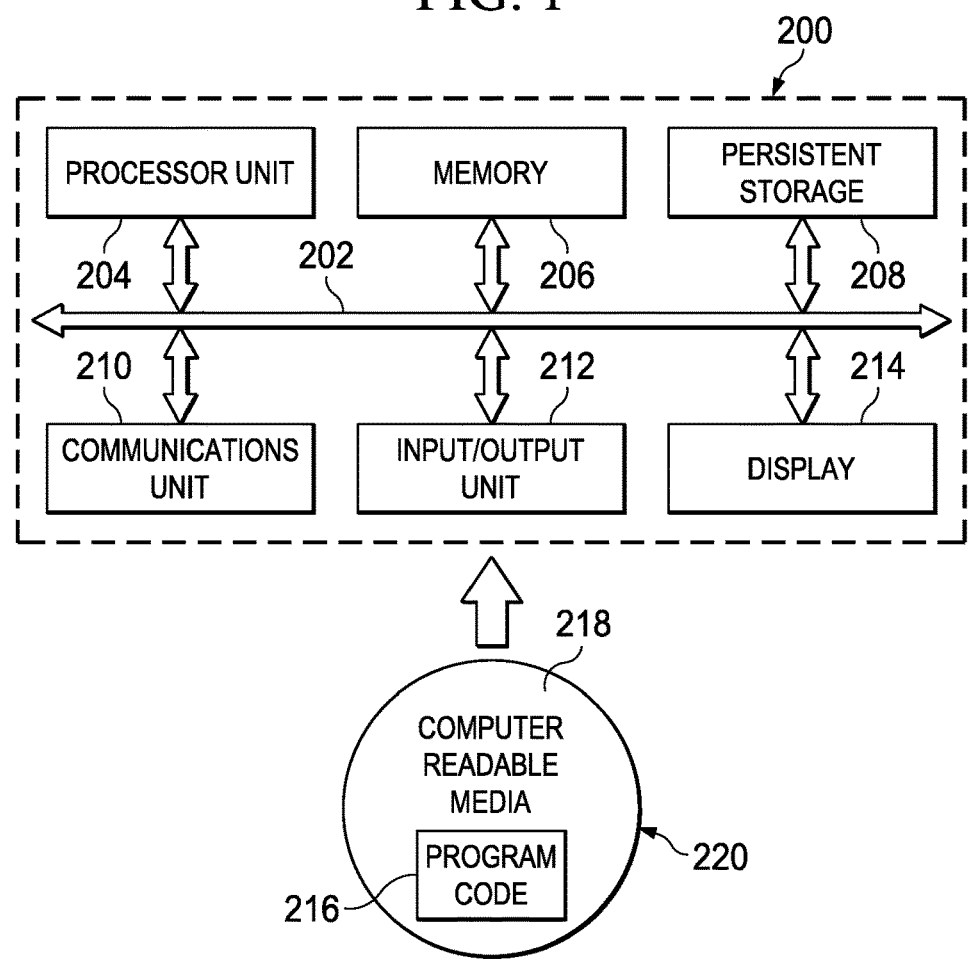
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Machine Learning

As well-known, machine learning involves the construction of algorithms that learn from data. Such algorithms typically operate by building a model based on inputs, and using that model to make predictions or decisions, rather than following only explicitly programmed instructions. One categorization of machine learning tasks arises by considering the desired output of a machine-learned system. In a classification approach, inputs are divided into two or more classes, and the learner must produce a model that assigns unseen inputs to one or more of these classes. A particular ML type is decision tree learning. This type of learning uses a decision tree as a predictive model, which maps observations about an item to conclusions about the item. Other types of ML algorithms include, without limitation: association rule learning, inductive logic programming, support vector machines, cluster analysis, Bayesian networks, reinforcement learning, representation learning, manifold learning, similarity and metric learning, and sparse dictionary learning.

In one approach herein, and as will be described below, preferably the machine learning model (the classifier) is generated and refined as needed using known machine learning tools and methods.

Identity and Access Management

As used herein, an "account" typically refers to an entity that contains a set of parameters that define application-specific attributes of a principal, which include the identity, user profile, and credentials.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

An "entitlement" refers to a capability-based reason that a user is given a permission or set of permissions to access IT resources (services).

An "identity" refers to a subset of profile data that uniquely represents a person or entity and that is stored in one or more repositories.

An "ownership type" refers to a category that classifies ownership accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user.

A "principal" is a person or group that has been granted permissions. It also refers to an entity that can communicate securely with another entity.

In identity management, "provisioning" refers to the process of providing, deploying, and tracking a service or component. To "provision" means to set up and maintain the access of a user to a system, or to create an account on a managed resource.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered; however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions help companies automate the process of provisioning employees, contractors, and business partners with access rights to the applications they need, whether in a closed enterprise environment or across a virtual or extended enterprise. A known product of this type is IBM® Security Identity Manager.

Figure 3:
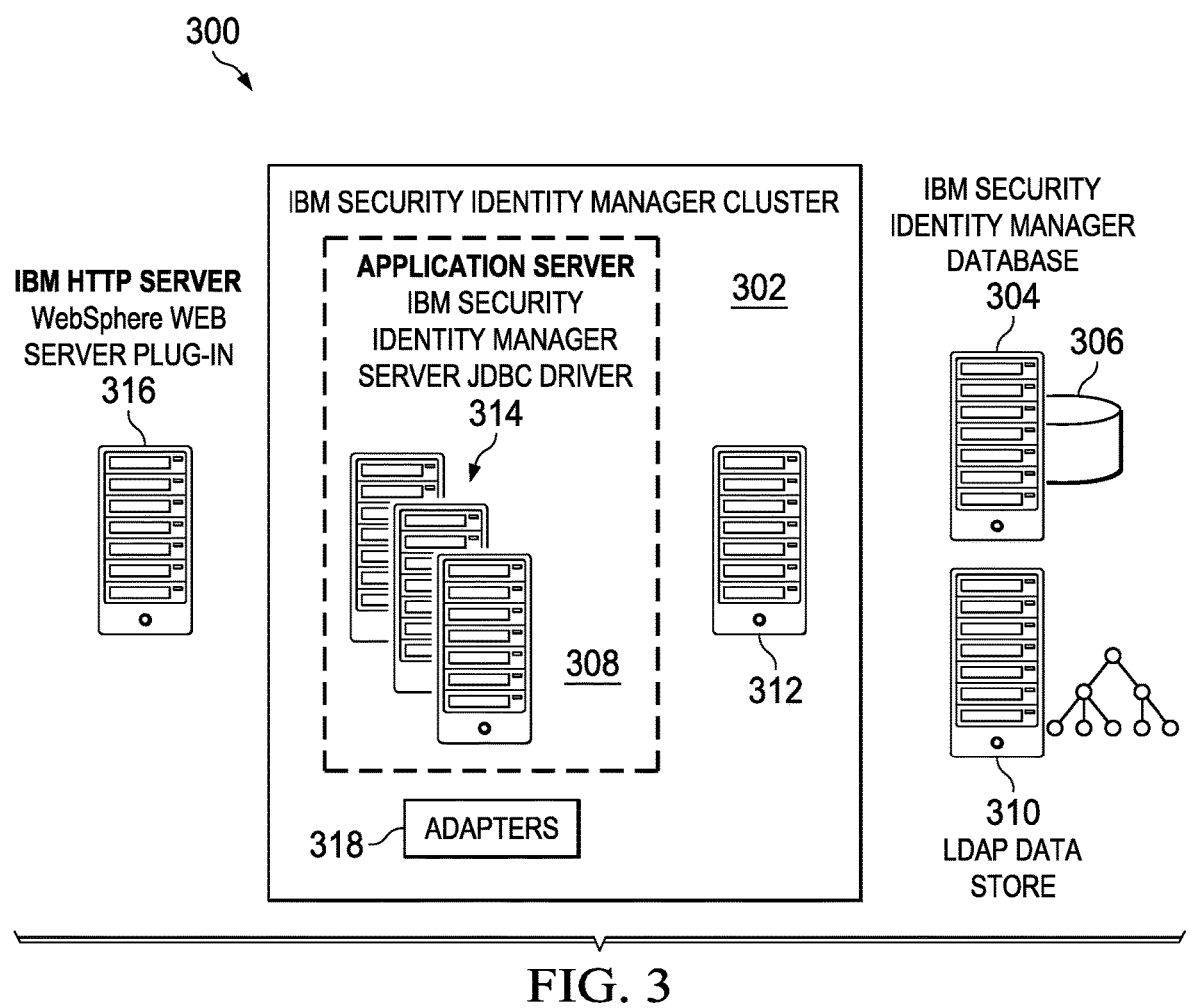
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. The solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for access management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
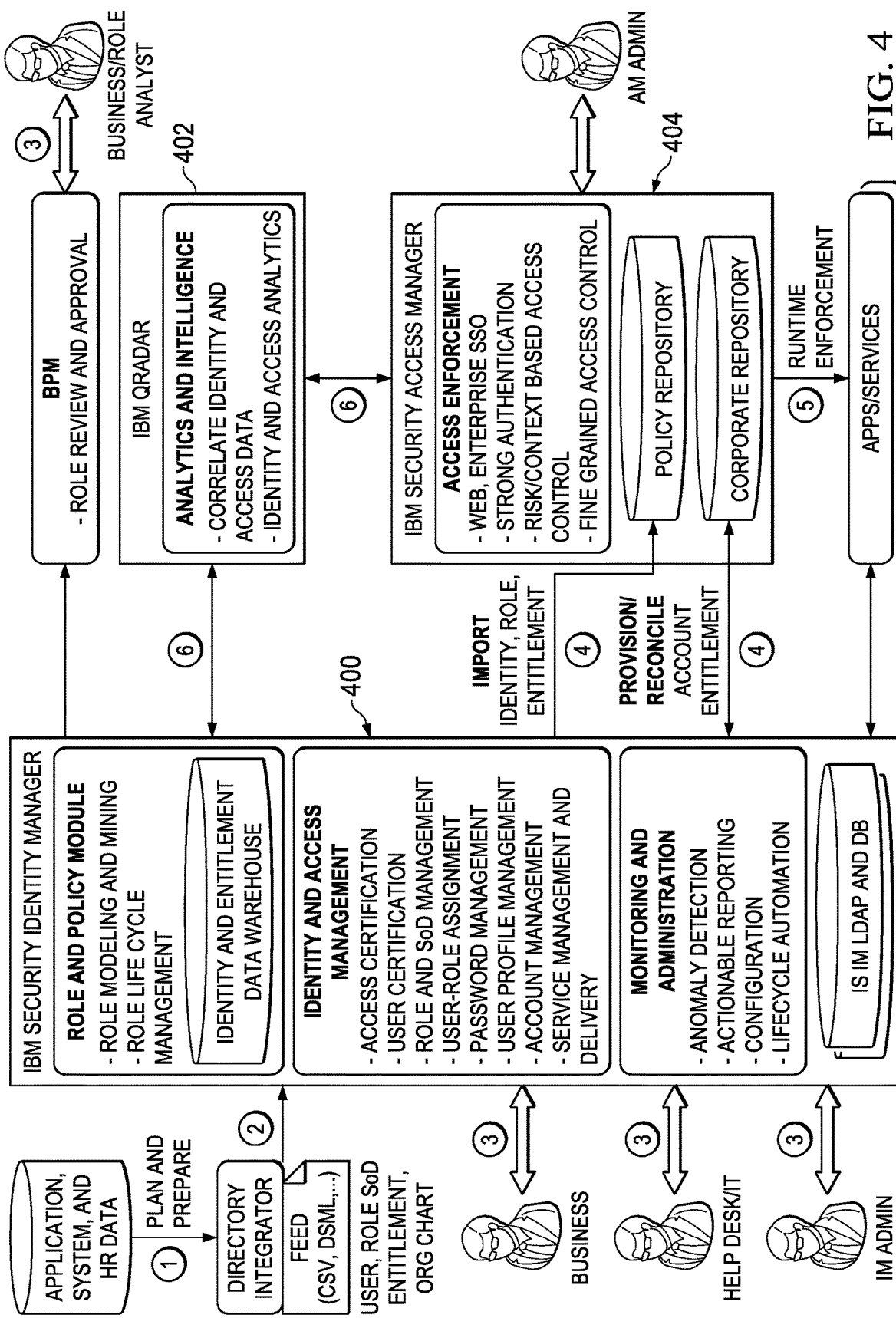
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (STEM) software system 402 (e.g., IBM QRadar), and an access and entitlement enforcement system (e.g., IBM® Security Access Manager) 404.

At step (1), the enterprise identifies the resources that it wants protected and the accesses it wants certified and monitored. The data is cleaned, filtered, and prepared for loading into the Identity and Access Management system 400 through TDI, LDAP Feed, flat files (CSV, DSML, etc.), or API. At step (2), the data may be loaded into a role and policy module 402 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. At step (4), the access and entitlement enforcement system 404 imports or provisions the data from Identity and Access management system 400 into the access and entitlement enforcement systems. At step (5), the enforcement system 404 uses the certified data for runtime enforcement. The STEM system 402 monitors actual user activity and provides feedback to fine-tune access policy planning, administration, and enforcement.

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes.

Preferably, the system enables certifiers to preview the impact of the certification before submitting it to see if any roles, accounts, or groups are affected by the access decision. Approval and recertification policies deliver change control at the user, role, and access level. Without substantially impacting the business, the change control process can consume any change to the business that affects the user, role, and access structure.

Using Classification Data as Training Set for Auto-Classification

With the above as background, the subject matter of this disclosure is now described.

As described above, and according to this disclosure, an identity management system is augmented (i.e. extended or supplemented) with one or more machine learning (ML) techniques to facilitate identification of account types, such as "admin" accounts. In one embodiment, the IAM system (as described above and as depicted in FIG. 4) has associated therewith a computing machine that executes one or more ML-based algorithms of the type described above. A computing machine may be implemented as depicted in FIG. 2.

The basic operation of this disclosure provides for a method to determine identity-centric risks in an enterprise. Typically, the risks that may be identified are varied and may include, without limitation, identification of too many Admin accounts, account sharing, cloning of access permissions, and the like. A particular problem addressed by the technique of this disclosure is the identification of excess Admin accounts, although the technique is not limited to this purpose. Indeed, the technique of this disclosure may be used for any data classification purposes within or associated with identity and access management generally.

In one preferred embodiment, the method begins by receiving a training set of data representing classifications of one or more accounts. The training set of data preferably is generated with the assistance of an operator or other permitted user, who enters data representing the classification of a set of accounts, e.g., as "privileged," "non-privileged," etc. Based on the classifications as a training set, a machine learning classifier is generated. The machine learning classifier corresponds to an associated ML algorithm, such as a decision tree. The particular type of ML classifier or ML technique is not limited to a particular approach, and the operator may select from one or more ML algorithms that are exposed by the system. The machine learning classifier is then applied to additional account data to identify, preferably in an automated manner, one or more attributes or characteristics (hereinafter "attributes" or "classifier attributes") that provide a given classification result that may be useful for classifying new data (e.g., representing accounts that need to be classified by the IAM system). A determination is then made whether the classification result represents an acceptable level of account classification. This determination may be evaluated against some given static configuration value, or runtime variable (e.g., time of day, type of account, etc.). When the classification result represents an acceptable level of account classification, the one or more classifier attributes are then applied to new data to attempt to detect an identity-centric risk. This latter operation preferably is carried out in association with the IAM system itself, e.g., during an evaluation whether to enforce classification of a particular Admin account.

Figure 5:
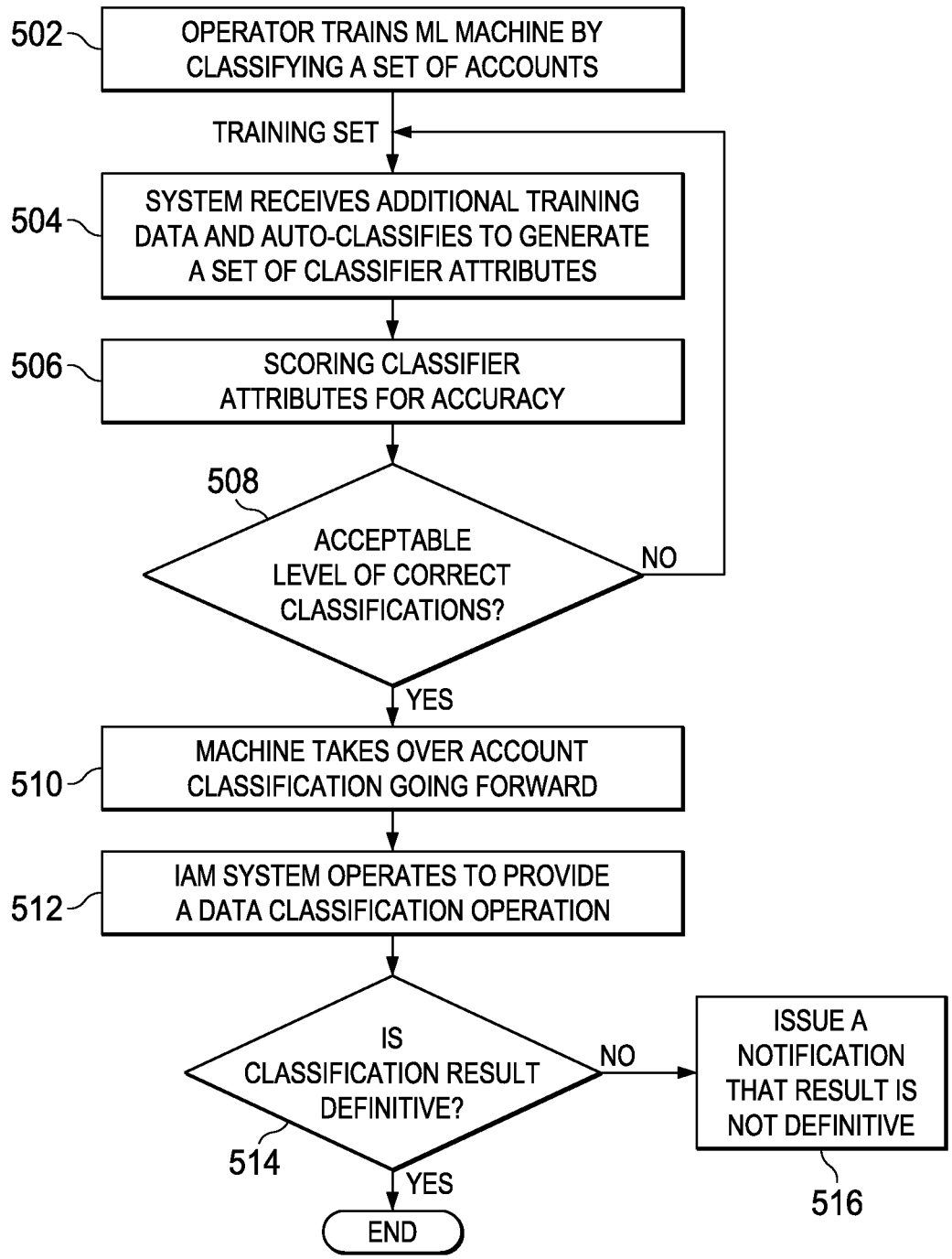
FIG. 5 depicts a process flow of the basic machine learning (ML)-supported data classification technique of this disclosure.

FIG. 5 illustrates the basic process flow of the basic machine learning (ML)-supported technique of this disclosure. Initially, and at step 502, an authorized user or operator (e.g., an administrator) trains the machine (executing an ML algorithm), preferably by classifying several accounts, e.g., as "admin," "non-privileged," or the like. Given the initial training, which produces a training set, the system then preferably auto-classifies one or more additional accounts. This is step 504. The result of the auto-classification step (typically a set of classifier attributes) is then scored for accuracy, possibly using human involvement. This is step 506. Once the algorithm reaches an acceptable level of correct classifications, as indicated by a positive outcome to a test at step 508, the machine takes over classification (e.g., the automated identification of admin type accounts). This is step 510. If the test at step 508 is negative, the routine returns to step 504 for an additional training iteration using the machine learning algorithm (or some other classifier operation). After the machine takes over classification, however, the process continues with the IAM system operating using the information provided by the ML training process. This is step 512, during which the IAM system performs one or more automated health checking operations, e.g., to detect or otherwise probe for identity-centric risks in the governance system. These operations include scanning for one or more weakness patterns, such as too many admins configured, account sharing, cloning of access permissions, or the like. At step 514, the routine tests to determine whether a classification result (derived from an automated scan in step 512) is not definitive (according to a configurable threshold). If so, the process notifies the operator to make a classification determination at step 516. This completes the process. Steps 514 and 516 are optional, and other IAM-based operations may be used instead.

Thus, the approach provides supervised, iterative ML-based functionality, preferably with a user-generated training set for classification. The training set may include various types of data, including characteristics or attributes of the account types, the users, or the like. A goal of the initial ML training (which may include one or multiple passes) is to enable the machine to identify specific characteristics or attributes that provide a good classification result, with the resulting classifications then applied within the IAM system. In particular, the output of the ML system may be used by the IAM system for enforcing rights associated with the identified accounts, modifying, suspending or deleting accounts, and so forth.

The approach has many possible variants. The nature of the ML algorithm may be varied. One or more different ML algorithms may be used for creating multiple training sets, which may be aggregated or otherwise processed as desired. Different ML techniques may be used across passes of the training. A particular ML algorithm may have its constraints modified after an initial pass.

The information that is used to train the system may be updated, e.g., periodically or upon a given occurrence, so that a new or modified or adjusted acceptable level of correct classifications may be determined by the ML-supported system. The new value is then provided to the IAM system for subsequent use as previously explained, e.g., to facilitate the further identification of admin type accounts, shared accounts, or cloned permissions, for modifying, suspending or deleting accounts, and the like.

By using the techniques herein, the IAM system is enabled to provide for more accurate management of accounts, thereby improving the overall accuracy and operation of the IAM system itself. In particular, by training the ML algorithm to classify accounts, and then using the resulting classifier, the IAM system provides for more accurate and higher levels of classification as compared to techniques that do not incorporate the ML-based support. The resulting IAM processing becomes more objective and more useful in ensuring that accounts are only available to those users who are entitled to them. Using the approach, managers and administrators also can enhance the effectiveness of how enterprise identities are managed and used.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes, and are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the "recertify" configuration tool, the administration page, or the workflow functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

While the approach herein of using classification data as a training set for auto-classification of Admin account rights is one preferred implementation, the technique herein (of using a training set, generating an ML classifier, using the classifier, etc.) may be generalized for use in the IAM system whenever data classification is required (irrespective of the particular type of data).

The techniques herein provide for improvements to another technology or technical field, namely, identity access and management systems, as well as improvements to the functioning of classification processes within such systems.

Having described our invention, what we now claim is as follows.

The invention claimed is:

1. A method to improve an ability of an identity and access management (IAM) computing system to determine identity-centric risks in an enterprise, comprising:
    receiving a training set of data representing classifications of one or more accounts;
    based on the classifications, computing a machine learning classifier using software executing in a hardware element;
    applying the machine learning classifier to additional account data to identify, in an automated manner, one or more attributes that cause the machine learning classifier to provide a given classification result, wherein at least one of the one or more attributes is an account type;
    determining in an automated manner whether the classification result represents a given level of account classification; and
    when the classification result represents the given level of account classification, applying the one or more attributes identified by the machine learning classifier to new data to attempt to detect an identity-centric risk.

2. The method as described in claim 1 further including re-computing the machine learning classifier when the classification result does not represent the given level of account classification.

3. The method as described in claim 1 wherein applying the one or more attributes to new data includes executing an identity and access management (IAM) detection process to scan for a weakness pattern that is one of: an excessive number of IAM Privileged Accounts (Admins), account sharing, and cloning of access permissions.

4. The method as described in claim 3 further including issuing a notification when the particular classification result generated by the IAM detection process is not definitive and requires further evaluation.

5. The method as described in claim 1 wherein the one or more accounts include IAM Privileged Accounts (Admins).

6. The method as described in claim 1 wherein determining whether the classification result represents the given level of account classification receives a user-supplied input.

7. Apparatus, comprising:
    a processor;
    computer memory holding computer program instructions executed by the processor to improve an ability of an identity and access management (IAM) computing system to determine identity-centric risks in an enterprise, the computer program instructions comprising:
        program code operative to receive a training set of data representing classifications of one or more accounts;
        program code operative based on the classifications to compute a machine learning classifier;
        program code operative to apply the machine learning classifier to additional account data to identify one or more attributes that cause the machine learning classifier to provide a given classification result, wherein at least one of the one or more attributes is an account type;
        program code operative to determine whether the classification result represents a given level of account classification; and
        program code operative when the classification result represents the given level of account classification to apply the one or more attributes identified by the machine learning classifier to new data to attempt to detect an identity-centric risk.

8. The apparatus as described in claim 7 wherein the computer program instructions further include program code operative to re-compute the machine learning classifier when the classification result does not represent the given level of account classification.

9. The apparatus as described in claim 7 wherein the computer program instructions further include an identity and access management (IAM) detection process operative to apply the one or more attributes to scan for a weakness pattern that is one of: an excessive number of IAM Privileged Accounts (Admins), account sharing, and cloning of access permissions.

10. The apparatus as described in claim 9 wherein the computer program instructions further include program code operative to issue a notification when the particular classification result generated by the IAM detection process is not definitive and requires further evaluation.

11. The apparatus as described in claim 7 wherein the one or more accounts include IAM Privileged Accounts (Admins).

12. The apparatus as described in claim 7 wherein the program code operative to determine whether the classification result represents the given level of account classification receives a user-supplied input.

13. A computer program product in a non-transitory computer readable medium for use in a data processing system, the computer program product holding computer program instructions executed by the data processing system to improve an ability of an identity and access management (IAM) computing system to determine identity-centric risks in an enterprise, the computer program instructions operative to:
- receive a training set of data representing classifications of one or more accounts;
- based on the classifications, to compute a machine learning classifier;
- apply the machine learning classifier to additional account data to identify one or more attributes that cause the machine learning classifier to provide a given classification result, wherein at least one of the one or more attributes is an account type;
- determine whether the classification result represents a given level of account classification; and
- when the classification result represents the given level of account classification, to apply the one or more attributes identified by the machine learning classifier to new data to attempt to detect an identity-centric risk.

14. The computer program product as described in claim 13 wherein the computer program instructions are further operative to re-compute the machine learning classifier when the classification result does not represent the given level of account classification.

15. The computer program product as described in claim 13 wherein the computer program instructions comprise an identity and access management (IAM) detection process further operative to apply the one or more attributes to scan for a weakness pattern that is one of: an excessive number of IAM Privileged Accounts (Admins), account sharing, and cloning of access permissions.

16. The computer program product as described in claim 15 wherein the computer program instructions are further operative to issue a notification when the particular classification result generated by the IAM detection process is not definitive and requires further evaluation.

17. The computer program product as described in claim 13 wherein the one or more accounts include IAM Privileged Accounts (Admins).

18. The computer program product as described in claim 13 wherein the program code operative to determine whether the classification result represents the given level of account classification receives a user-supplied input.

19. An apparatus for identity and access management (IAM), comprising:
- a hardware processor;
- computer memory holding computer program instructions executed by the hardware processor to improve an ability of an automated IAM detection process to detect identity-centric risks, the computer program instructions comprising program code configured to compute and apply a machine learning classifier to identify one or more account type attributes that cause the machine learning classifier to provide a given data classification result, and to apply the one or more account type attributes identified by the machine learning classifier to enforce a data classification decision.

20. The apparatus as described in claim 19 wherein the data classification decision is that a particular account has a first or second classification.

* * * * *